United States Patent
Lahnala

(10) Patent No.: US 7,219,470 B2
(45) Date of Patent: *May 22, 2007

(54) SLIDING WINDOW ASSEMBLY AND A TRACK MEMBER FOR SAME

(75) Inventor: David W. Lahnala, Adrian, MI (US)

(73) Assignee: AGC Automotive Americas Co., Florence, KY (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/919,065

(22) Filed: Aug. 16, 2004

(65) Prior Publication Data

US 2005/0150171 A1    Jul. 14, 2005

Related U.S. Application Data

(60) Provisional application No. 60/535,331, filed on Jan. 9, 2004.

(51) Int. Cl.
*E05D 15/06* (2006.01)

(52) U.S. Cl. .............................. 49/413; 49/213; 49/380; 16/95 R

(58) Field of Classification Search .................. 49/413, 49/209, 213, 130, 214, 127, 128, 229, 380; 49/404, 410, 411; 16/96 R, 95 R, 87 R, 16/93 R
See application file for complete search history.

(56) References Cited

U.S. PATENT DOCUMENTS

| | | | |
|---|---|---|---|
| 1,269,133 A | * | 6/1918 | Townsend .................... 16/93 R |
| 1,563,287 A | | 11/1925 | Pape |
| 2,889,590 A | | 6/1959 | Kunkel |
| 2,992,460 A | | 7/1961 | Hentges |
| 3,042,960 A | * | 7/1962 | Spork .......................... 16/105 |
| 3,417,509 A | | 12/1968 | Sherron |
| 3,635,787 A | * | 1/1972 | Shanok et al. .............. 428/167 |
| 4,124,054 A | | 11/1978 | Spretnjak |
| 4,384,429 A | | 5/1983 | Rokicki et al. |
| 4,561,224 A | | 12/1985 | Jelens |
| 4,590,707 A | | 5/1986 | von Resch |
| 4,635,398 A | | 1/1987 | Nakamura |
| 4,662,108 A | | 5/1987 | Duran Romero et al. |
| 4,785,583 A | | 11/1988 | Kawagoe et al. |
| 4,850,139 A | | 7/1989 | Tiesler |
| 4,934,098 A | | 6/1990 | Prouteau et al. |
| 5,357,651 A | * | 10/1994 | Jones et al. ................. 16/95 R |

(Continued)

OTHER PUBLICATIONS

U.S. Appl. No. 10/918,944, filed Aug. 16, 2004.

*Primary Examiner*—Gregory J. Strimbu
(74) *Attorney, Agent, or Firm*—Howard & Howard Attorneys, P.C.

(57) ABSTRACT

A sliding window assembly for a vehicle includes an upper track member, a lower track member, and a sliding unit. The track members each define a first channel having a first depth, a second channel having a second depth, and a third channel having a third depth less than the first and second depths. The sliding unit includes upper and lower edges. Each edge has a first tab and a second tab extending from the edge. The sliding unit slides in the track members to move between an open and a closed position. The first tabs slide in the first channels, the second tabs slide in the second channels, and the edges slide in the third channels.

29 Claims, 9 Drawing Sheets

U.S. PATENT DOCUMENTS

| | | |
|---|---|---|
| 5,442,880 A | 8/1995 | Gipson |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,542,214 A | 8/1996 | Buening |
| 5,603,546 A * | 2/1997 | Desir, Sr. ................... 296/93 |
| 5,613,323 A | 3/1997 | Buening |
| 5,784,833 A | 7/1998 | Sponsable et al. |
| 5,799,444 A | 9/1998 | Freimark et al. |
| 5,836,110 A | 11/1998 | Buening |
| 5,996,284 A | 12/1999 | Freimark et al. |
| 5,996,285 A | 12/1999 | Guillemet et al. |
| 6,223,470 B1 | 5/2001 | Millard et al. |
| 6,438,912 B1 | 8/2002 | Avent |
| 6,497,072 B2 * | 12/2002 | Fries ........................... 49/209 |
| 6,591,552 B1 | 7/2003 | Rasmussen |
| 2002/0148163 A1 | 10/2002 | Warner et al. |
| 2003/0089043 A1 | 5/2003 | Oberheide |
| 2003/0182866 A1 | 10/2003 | Nestell et al. |
| 2003/0213179 A1 | 11/2003 | Galer |
| 2004/0020131 A1 | 2/2004 | Galer et al. |
| 2004/0055242 A1* | 3/2004 | Iwakawa et al. .............. 52/578 |
| 2005/0044797 A1 | 3/2005 | Daniel et al. |
| 2005/0044798 A1 | 3/2005 | Daniel et al. |
| 2005/0044799 A1 | 3/2005 | Kinross et al. |
| 2006/0150512 A1* | 7/2006 | Heithe et al. ................. 49/141 |

* cited by examiner

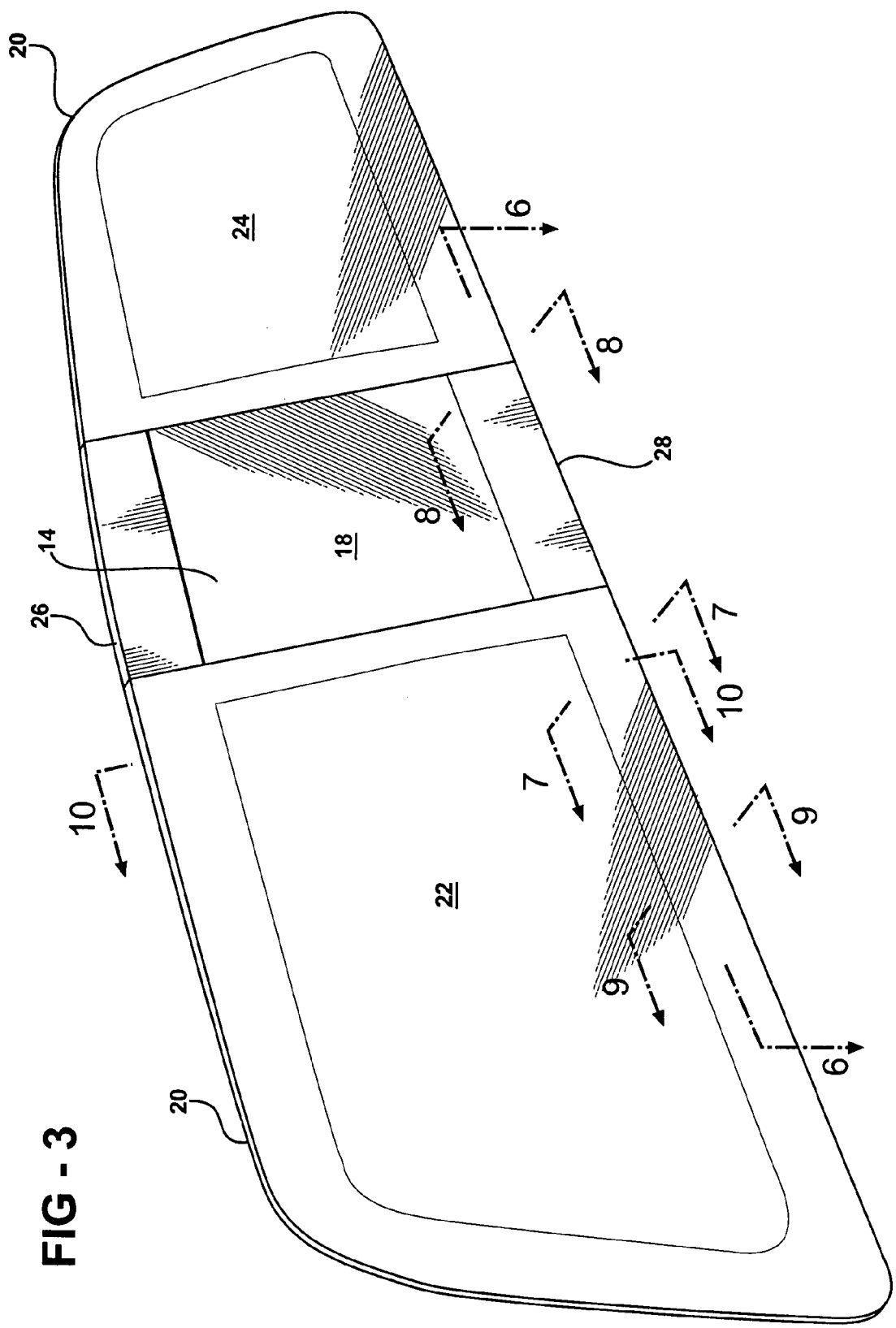

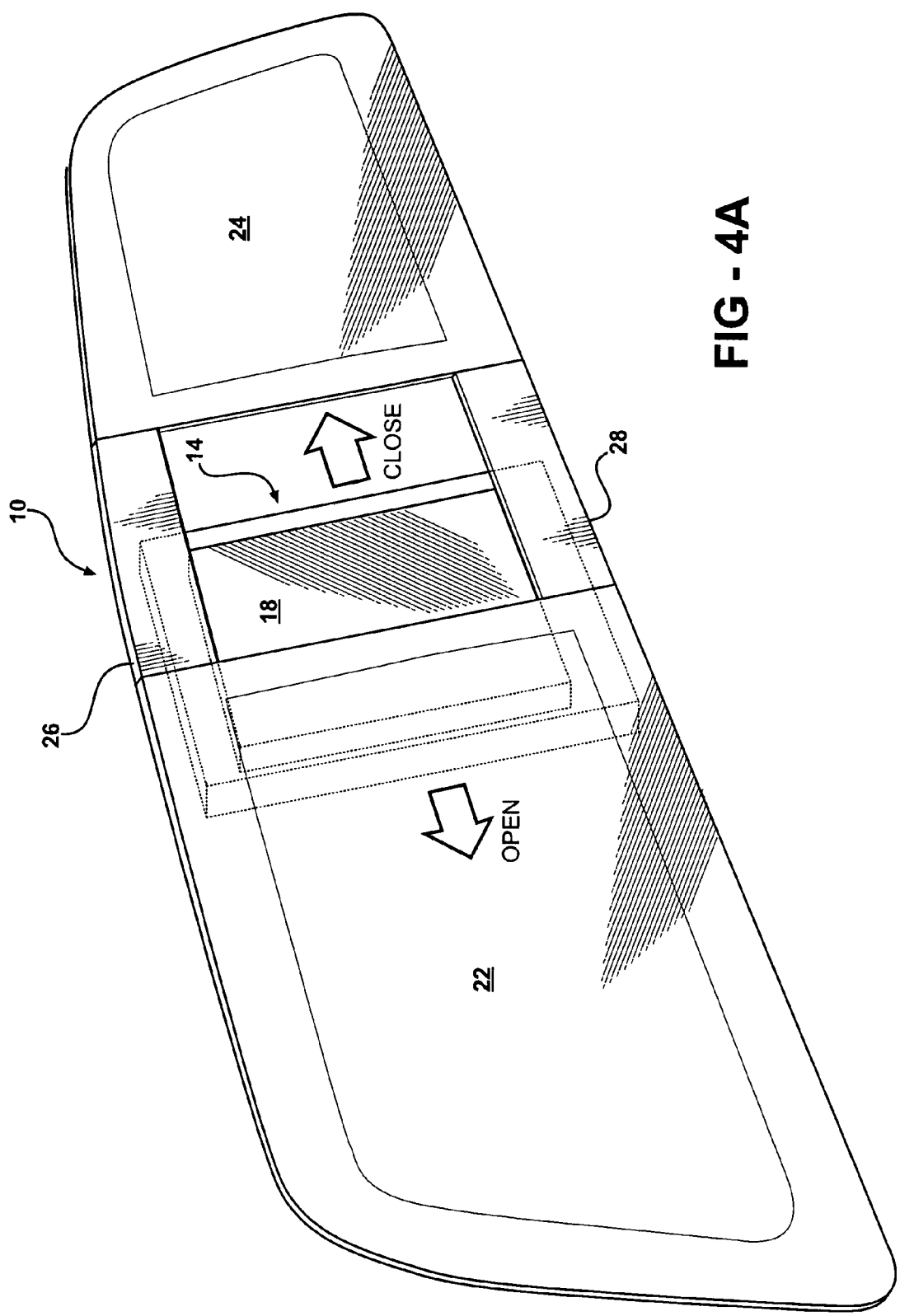

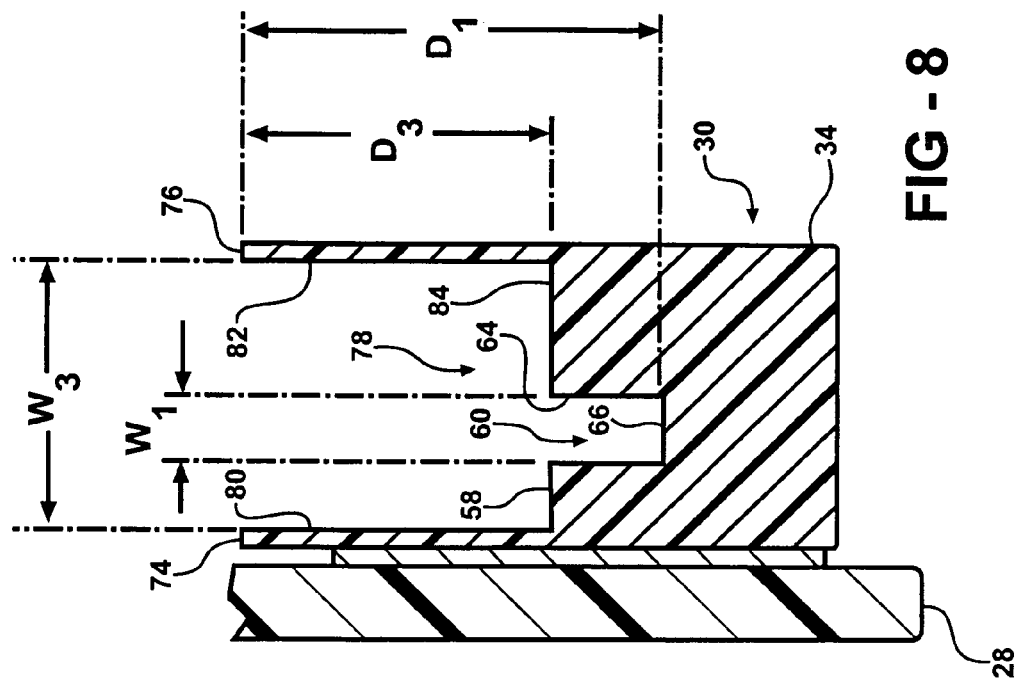
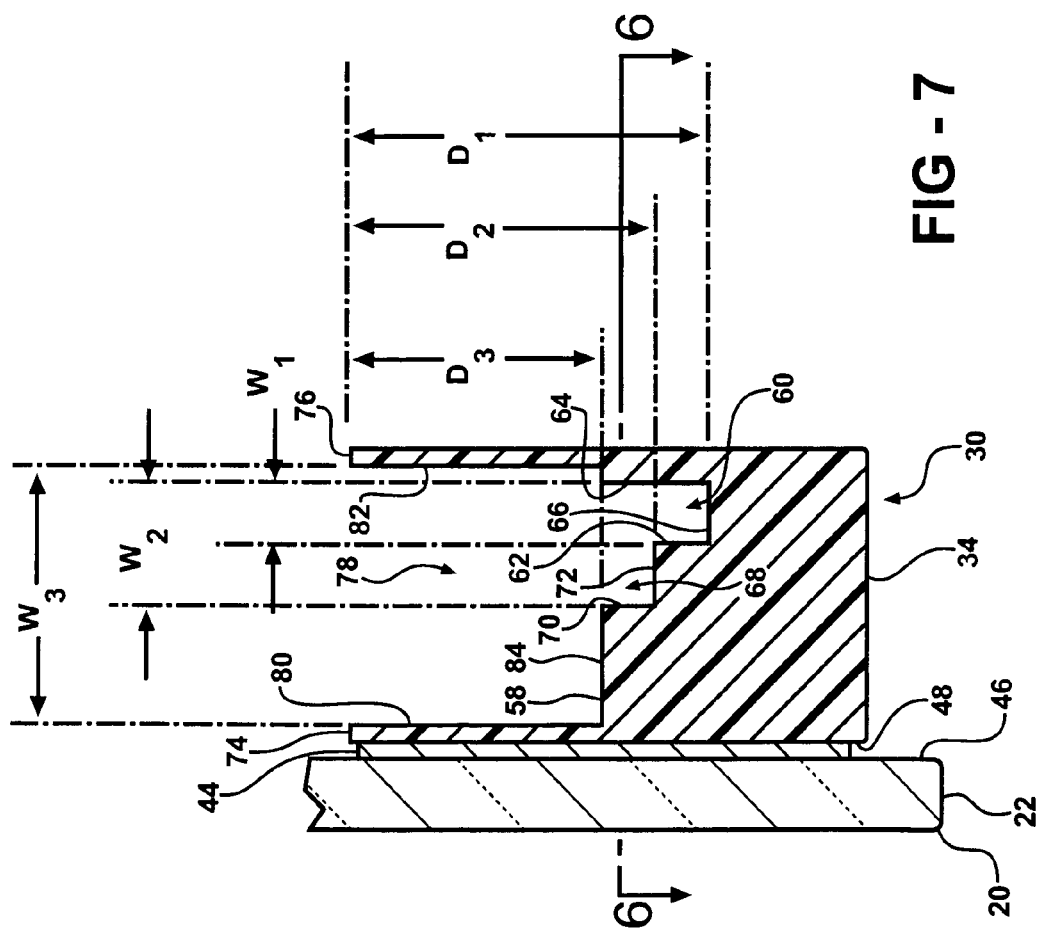

US 7,219,470 B2

SLIDING WINDOW ASSEMBLY AND A TRACK MEMBER FOR SAME

RELATED APPLICATIONS

The subject patent application claims priority to and all the benefits of U.S. Provisional Patent Application Ser. No. 60/535,331, which was filed on Jan. 9, 2004.

BACKGROUND OF THE INVENTION

1. Field of the Invention

The subject invention generally relates to a sliding window assembly, particularly for a vehicle, wherein a sliding unit is slidable along a track member.

2. Description of the Related Art

Various sliding window assemblies for vehicles are known in the prior art. An example of such an assembly is disclosed in U.S. Pat. No. 5,542,214 (the '214 patent) to Buening.

The sliding window assembly disclosed by the '214 patent includes a sliding panel slidable along a track member between an open and a closed position. A first pin and a second pin are affixed to the sliding panel to interface with the track member. The track member includes a first channel extending to a first depth for receiving the first pin and a second channel extending to a second depth for receiving the second pin. The first channel defines a first width and the second channel defines a second width. The first width is less than the second width. Accordingly, the first pin is sized to only fit in the first channel and the second pin is sized to only fit in the second channel. The first and second channels each have a right angle bend for forcing the pins attached to the sliding panel to abruptly change direction by 90° as the panel is moved from the open to the closed position. This abrupt change in direction is difficult to operate and results in a window assembly that is not aesthetically pleasing when opening. Also, the sliding panel is not supported by the track member, thus promoting vibration and rattle.

The prior art, as evidenced by the specific disclosure of the '214 patent, provides many sliding window assemblies. However, there remains an opportunity to provide a sliding window assembly including a sliding panel that is easy to operate and that has a smooth and stable movement between an open and a closed position.

SUMMARY OF THE INVENTION AND ADVANTAGES

The invention provides a sliding window assembly for a vehicle. The sliding window assembly includes a track member and a sliding unit. The sliding unit includes an edge that is slidable in the track member for moving the sliding unit between a closed position and an open position. The sliding unit includes first and second tabs extending from the edge for interfacing with the track member. The track member defines three channels. A first channel extends to a first depth for receiving the first tab. A second channel extends to a second depth for receiving the second tab. Finally, a third channel extends to a third depth, less than the first and second depths, for receiving the edge of the sliding unit.

Accordingly, the combination of the first, second, and third channels provides for an extremely stable and smooth movement of the sliding unit between the open and closed positions. Due to the multitude of channels engaged with the sliding unit, rattle and vibration of the sliding unit as the vehicle moves is significantly reduced with respect to sliding window assemblies of the prior art.

DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 3 is a perspective view of the sliding window assembly with the sliding unit in a closed position;

FIG. 4A is a perspective view of a preferred embodiment of the sliding window assembly with the sliding unit horizontally movable between an open and the closed position;

FIG. 7 is a cross-sectional side view taken along lines 7—7 of FIG. 3 and

FIG. 6 illustrating the first and second channels and a third channel of the track member;

FIG. 8 is a cross-sectional side view taken along lines 8—8 of FIG. 3 and FIG. 8 illustrating the first and third channels of the track member;

DETAILED DESCRIPTION OF THE INVENTION

Figure 1:
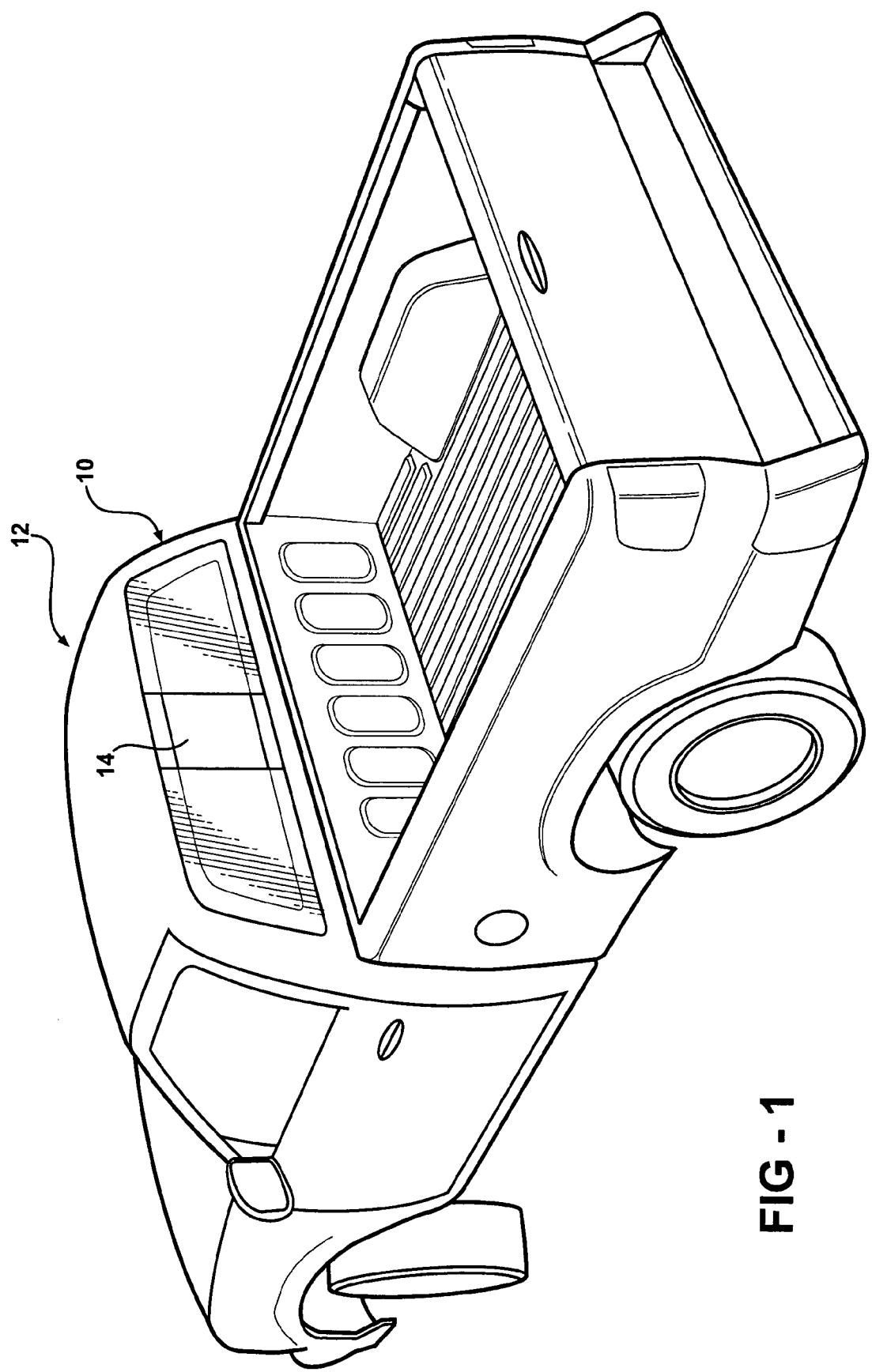
FIG. 1 is a perspective view of a vehicle with a sliding window assembly implemented as a backlite of the vehicle.
Figure 9:
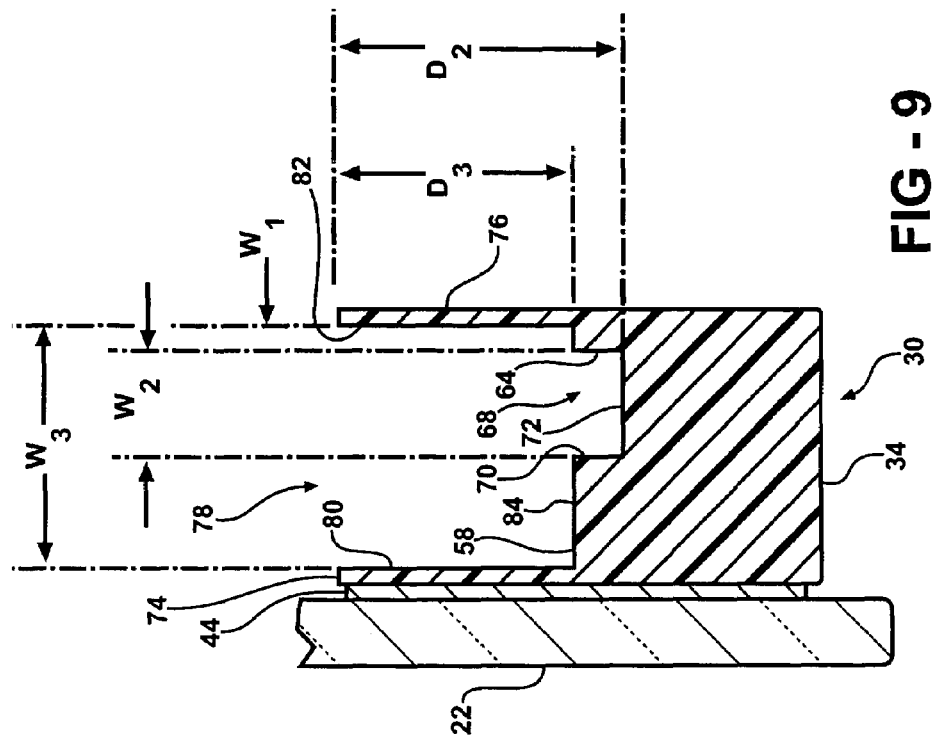
FIG. 9 is a cross-sectional view taken along lines 9—9 of FIG. 3 and FIG. 8 illustrating the second and third channels of the track member.

Referring to the Figures, wherein like numerals indicate like parts throughout the several views, a sliding window assembly is generally shown at 10. Referring to FIG. 1, the sliding window assembly 10 is shown in a vehicle 12, specifically as a backlite in a pickup truck. However, it is to be appreciated that the sliding window assembly 10 of the present invention can be implemented in other types of vehicles, as well as in non-vehicle applications.

Figure 2:
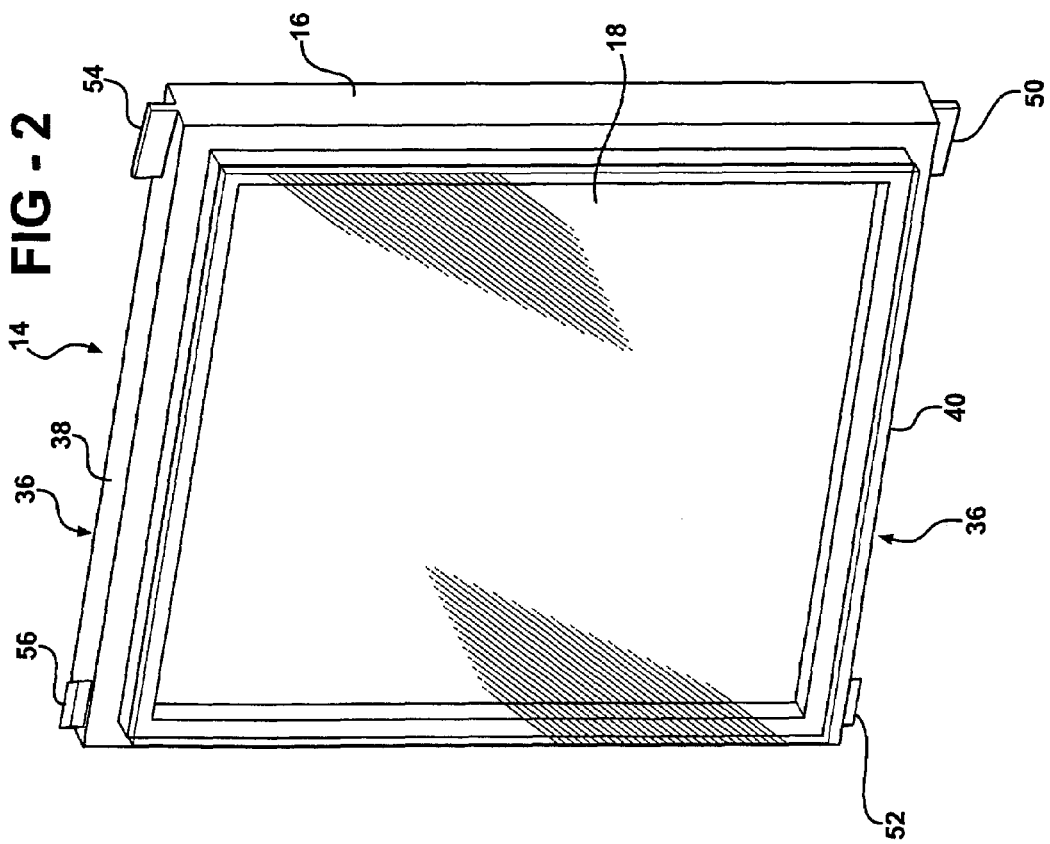
FIG. 2 is a perspective view of a sliding unit of the sliding window assembly.

Referring to FIG. 2, the assembly 10 includes a sliding unit 14 that is slidable between a closed position and an open position. In the preferred embodiment of FIG. 2, the sliding unit 14 includes a carrier component 16 and a sliding panel 18 connected to the carrier component 16. The carrier component 16 is preferably formed of a rigid plastic, such as Zytel®, or a similar plastic of a polymer family. The sliding panel 18 is preferably formed of glass. However, the sliding panel 18 may be formed of plastic, metal, or any other suitable material. A connection between the carrier component 16 and the sliding panel 18 may be accomplished by encapsulating the carrier component 16 around the sliding panel 18. Alternatively, the sliding panel 18 may be adhered to the carrier component 16.

In FIG. 3, the assembly 10 is shown with the sliding unit 14 in the closed position. The assembly 10 further includes at least one fixed panel 20. In the preferred embodiment, the at least one fixed panel 20 is further defined as a first fixed panel 22 and a second fixed panel 24. The first and second fixed panels 22, 24 are spaced apart from each other and define an opening therebetween. The sliding unit 14 moves between the open and closed positions to modify a size of the opening. Like the sliding panel 18, the first and second fixed panels 22, 24 are preferably formed of glass, but can be formed of plastic, metal, and the like.

In the preferred embodiment, the assembly 10 establishes a substantially flush exterior surface when the sliding unit 14 is closed. More specifically, the sliding panel 18 includes an exterior surface and the first and second fixed panels 22, 24 include exterior surfaces. When the sliding unit 14 is in the closed position, all of these exterior surfaces are substantially flush relative to one another. Preferably, the assembly 10 also includes an upper panel 26 and a lower panel 28 situated in the opening between the first and second fixed panels 22, 24, and above and below the sliding panel 18. The upper and lower panels 26, 28 also each have an exterior surface which is substantially flush relative to the exterior surfaces of the first and second fixed panels 22, 24 and the exterior surface of the sliding panel 18 when the sliding unit 14 is in the closed position. The upper and lower panels 26, 28 are preferably formed of a polycarbonate plastic, but can be formed of other plastics, glass, metal, and the like.

Figure 4B:
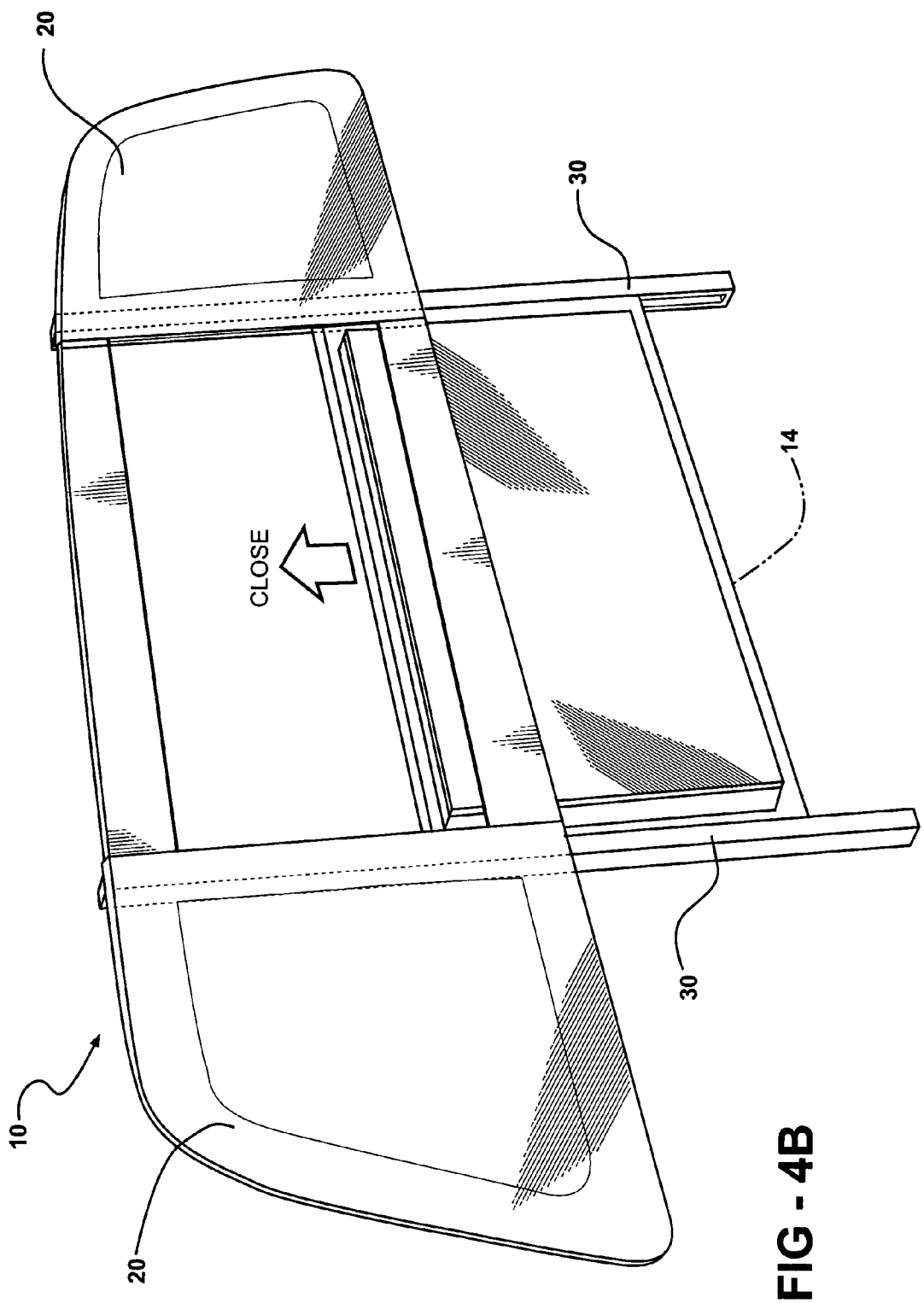
FIG. 4B is a perspective view of an alternative embodiment of the sliding window assembly with the sliding unit vertically movable between the open and the closed position.

The sliding unit 14 slides horizontally, as shown in FIG. 4A, in the preferred embodiment. While sliding, the sliding unit 14 moves inward relative to the first fixed panel 22, i.e., toward an interior or cab of the vehicle 12. It is appreciated, however, that horizontal movement of the sliding unit 14 is not a necessary component of the scope of the invention. Accordingly, FIG. 4B illustrates an alternative embodiment where the sliding unit 14 is adapted to slide vertically.

Figure 5:
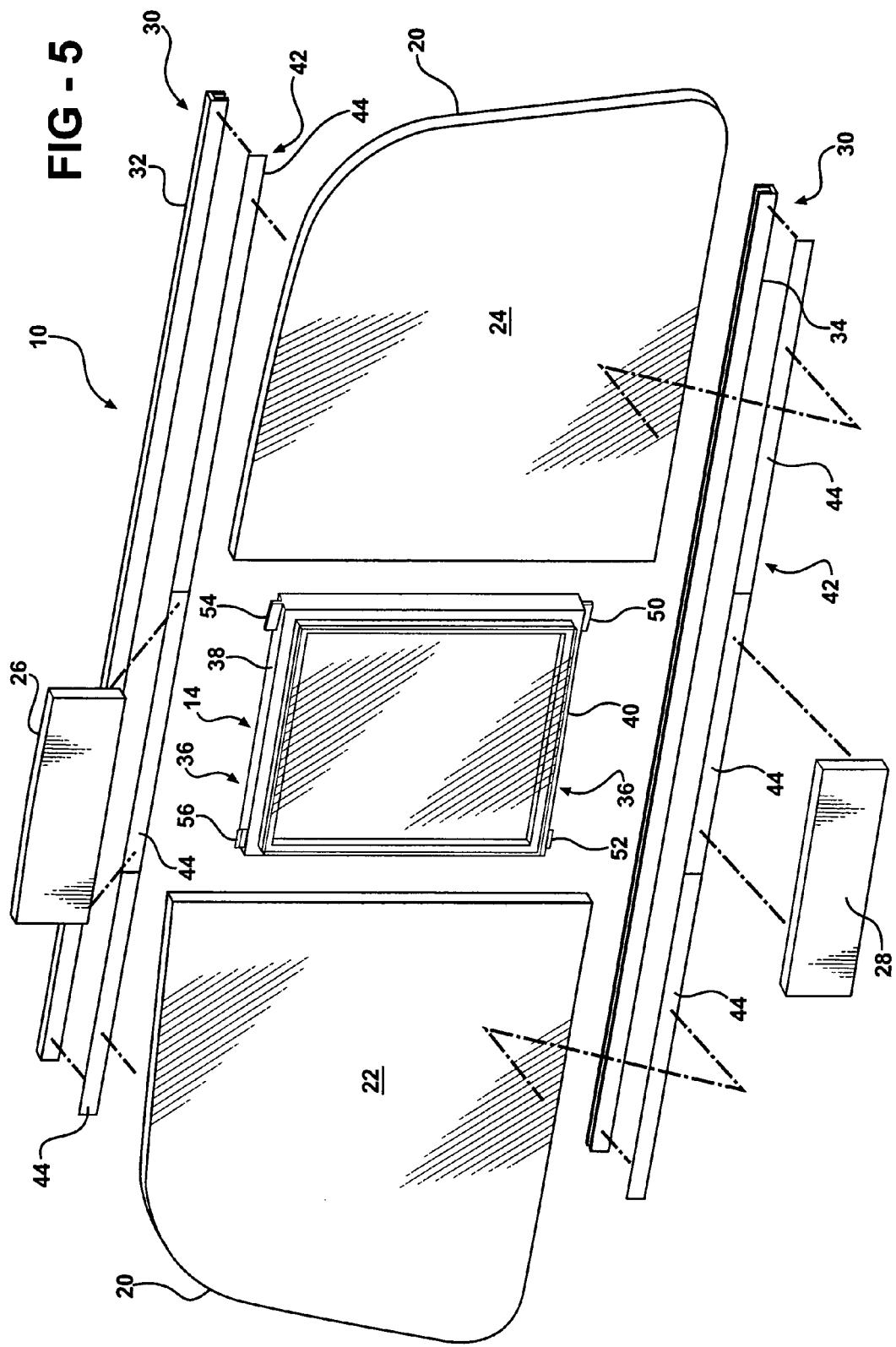
FIG. 5 is an exploded view of the preferred embodiment of the sliding window assembly.

FIG. 5 shows the various elements of the preferred embodiment of the assembly 10 in an "exploded" illustration. The assembly 10 further includes at least one track member 30 for supporting and for enabling movement of the sliding unit 14 as described additionally below. In the preferred embodiment, the at least one track member 30 is implemented as an upper track member 32 and a lower track member 34. The upper track member 32 is spaced from and substantially parallel to the lower track member 34. However, those skilled in the art appreciate that the assembly 10 can be implemented with only one track member 30 interfacing with the sliding unit 14.

The sliding unit 14 includes at least one edge 36 slidable in the track member 30 for moving the sliding unit 14 between the closed position and the open position. In the preferred embodiment, the sliding unit 14 includes an upper edge 38 slidable in the upper track member 32 and a lower edge 40 slidable in the lower track member 34.

The first and second fixed panels 22, 24 of the preferred embodiment are operatively connected to the track member 30. An adhesive 42 is used to adhere the fixed panels 22, 24 to the track member 30. Preferably, the adhesive 42 is an adhesive tape 44. An example of an acceptable tape 44 is a two sided foam tape manufactured by the 3M Company headquartered in St. Paul, Minn. Alternatively, a urethane adhesive, encapsulation, or other suitable adhesive may be used instead of the adhesive tape 44. As best seen in FIG. 7, the fixed panel 20 includes an interior side 46 and the track member 30 includes an outside facing 48. It is further preferred that the interior side 46 is only adhered to the outside facing 48. Moreover, the upper panel 26 is adhered to the upper track member 32 and the lower panel 28 is adhered to the lower track member 34.

The assembly 10 is preferably installed into the vehicle 12 by adhering the interior side 46 the fixed panel 20 directly to a window frame (not shown) of the vehicle 12. Of course, those skilled in the art recognize other suitable methods for installing the assembly 10 in the vehicle.

Referring again to FIG. 5, the sliding unit 14 also includes a first tab 50 and a second tab 52 extending from the edge 36 for interfacing with the track member 30. In the preferred embodiment the first and second tabs 50, 52 extend from the lower edge 40. A third tab 54 and a fourth tab 56 extend from the upper edge 38. The third and fourth tabs 54, 56 are preferably identical in shape in size to and are mirror images of the first and second tabs 50, 52.

Referring now to FIGS. 6 through 9, with the best illustration in FIG. 7, the track member 30 includes a base portion 58 with an outer guide 74 and an inner guide 76 extending from the base portion 58. For purposes of clarity, the track member 30 will be described below as implemented as the lower track member 34. As a result, the first and second tabs 50, 52 along with the lower edge 40 will be described in conjunction with the lower track member 34. It is realized, however, that the track member 30 can be implemented as the upper track member 32 along with the third and fourth tabs 54, 56 and the upper edge 38.

The track member 30 defines a first channel 60 within the base portion 58. The first channel 60 extends to a first depth $D_1$ for receiving the first tab 50. More specifically, the track member 30 includes a first internal surface 62, a second internal surface 64, and a bottom surface 66 which define the first channel 60. A first width $W_1$ is defined as the distance between the first and second internal surfaces 62, 64. The first tab 50 is sized to mate with the first width $W_1$ of the first channel 60. Specifically, the first tab 50 has a width that is slightly less than the first width $W_1$ of the first channel 60. This allows the first tab 50 to be received by the first channel 60 and slide easily along the first channel 60 as the sliding unit 14 moves between the closed and open positions.

The track member 30 also defines a second channel 68 within the base portion 58. The second channel 68 extends to a second depth $D_2$ for receiving the second tab 52. The track member 30 further includes a third internal surface 70 and a first ledge 72. The third internal surface 70, the first ledge 72, and the second internal surface 64 define the second channel 68. A second width $W_2$ is defined as the distance between the second and third internal surfaces 64, 70. In the preferred embodiment, the second depth $D_2$ is less than the first depth $D_1$. The second tab 52 is sized to mate with the second width $W_2$ of the second channel 68. The second tab 52 has a width that is slightly less than the second depth $D_2$, allowing the second tab 52 to slide easily along the second channel 68. Also in the preferred embodiment, the first width $W_1$ is less than the second width $W_2$. Additionally, the first width $W_1$ is also less than the width of the second tab 52. This prevents the second tab 52 from being received by the first channel 60, primarily as the sliding unit 14 moves between the closed and open positions.

It is appreciated that the first channel 60 may not necessarily be deeper and narrower than the second channel 68. For example, the first channel 60 may alternatively extend to the second depth $D_2$ and define the second width $W_2$.

Likewise, the second channel 68 may extend to the first depth $D_1$ and define the first width $W_1$. Of course, the various features of the first and second tabs 50, 52 would be sized properly to mate with the alterative first and second channels 60, 68.

The track member 30 includes a fourth internal surface 80 and a fifth internal surface 82. As shown best in FIG. 7, the fourth internal surface 80 is one side of the outer guide 74 and the fifth internal surface 82 is one side of the inner guide 76. The base portion 58 includes a second ledge 84. The third channel 78 is defined by the second ledge 84 and the fourth and fifth internal surfaces 80, 82. The third channel 78 extends to a third depth $D_3$. The third depth $D_3$ is less than the first and second depths $D_1$, $D_2$ and receives the edge 36 of the sliding unit 14. A third width $D_3$ is defined as a distance between the fourth and fifth internal surfaces 80, 82. The first and second widths $D_1$, $D_2$ are less than the third width $D_3$ and a width of the edge 36. This prevents the edge 36 from entering the first and second channels 60, 68.

The combination of the first, second, and third channels 60, 68, 78 defined by the track member 30 allows for secure and stable movement of the sliding unit 14 between the open and closed positions. The combination also reduces rattle or shaking of the sliding unit 14 during movement.

Figure 6:
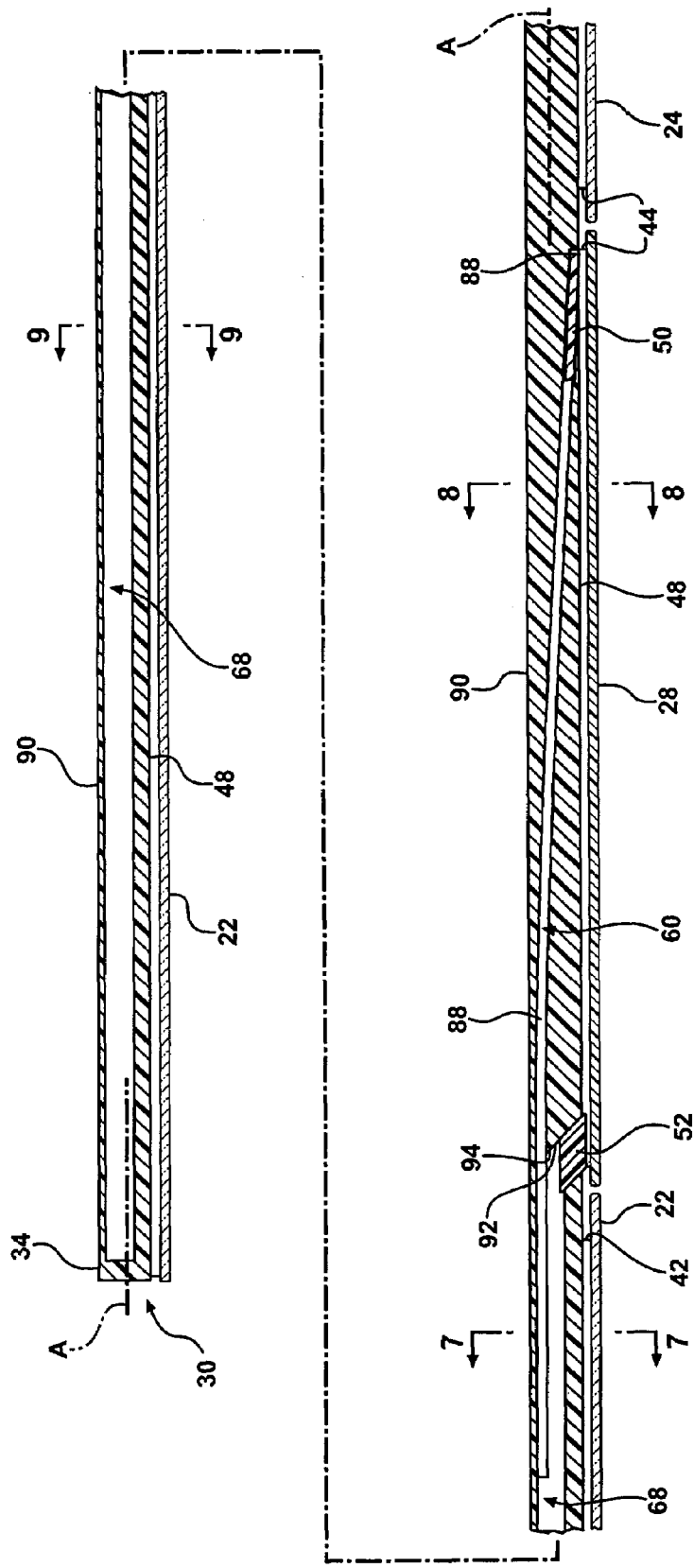
FIG. 6 is a cross-sectional top view taken along line 6—6 of FIG. 3 illustrating a track member having first and second channels and first and second tabs of the sliding unit received within the first and second channels.

Referring now to FIG. 6, a longitudinal axis A extends lengthwise between ends of the track member 30. In the preferred embodiment, the first channel 60 includes a portion 88 extending non-parallel to the longitudinal axis A. This non-parallel portion 88 allows guiding of the first tab 50 between the outside facing 48 of the track member 30 and an inside facing 90 of the track member 30 as the sliding unit 14 moves between the closed and open positions. This provides for a smooth and aesthetically pleasing movement of the sliding unit 14 from a closed position where the sliding panel 18 is flush with the fixed panels 22, 24 to an open position where the sliding unit 14 is compactly disposed inward relative to the first fixed panel 22. It is further preferred that the portion 88 of the first channel 60 is curvilinear. The curvilinearity of the portion 88 allows for further smoothness of movement of the sliding unit 14.

The track member 30 additionally includes an angled internal surface 92 defining an end 94 of the second channel 68. This angled internal surface 92 engages the second tab 52 and forces the sliding unit 14 into the closed position as the sliding unit 14 moves from the open to the closed position.

Figure 10C:
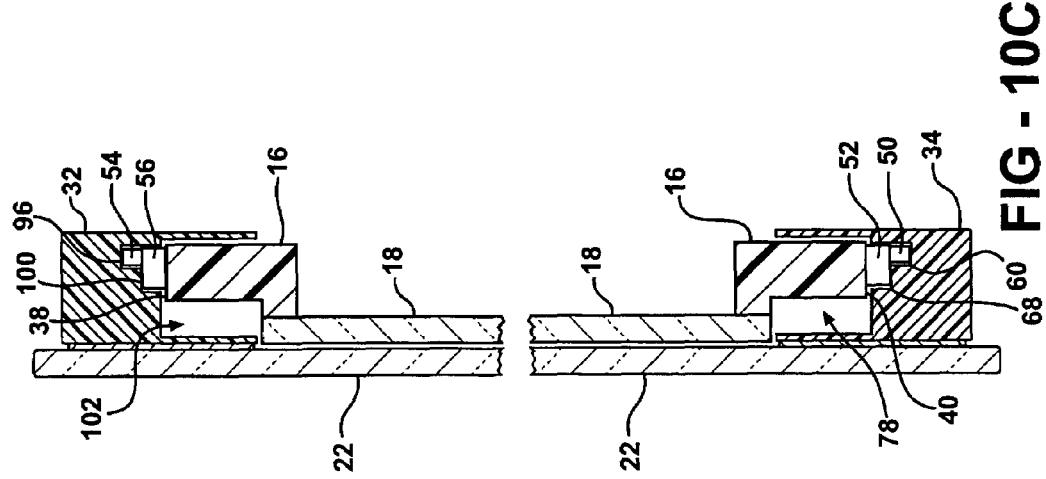
FIG. 10C is a cross-sectional side view of the sliding window assembly showing the lower track member with the first, second, and third channels, and the upper track member with the fourth, fifth, and sixth channels.
Figure 10B:
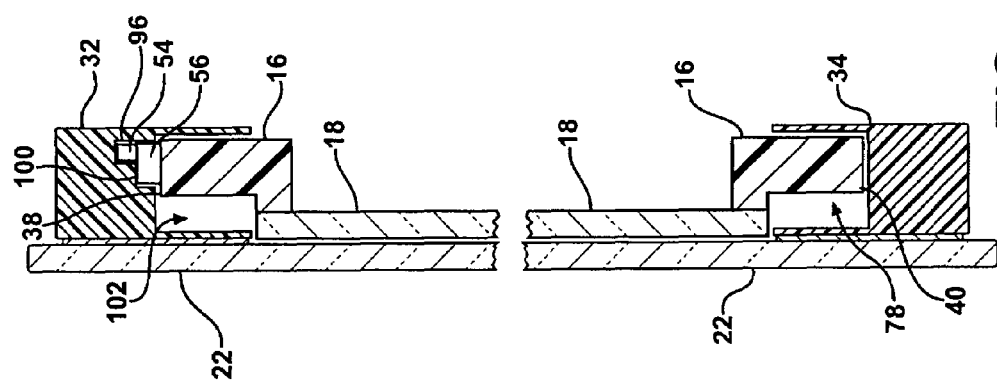
FIG. 10B is a cross-sectional side view of the sliding window assembly showing the lower track member and the upper track member with fourth, fifth, and sixth channels.
Figure 10A:
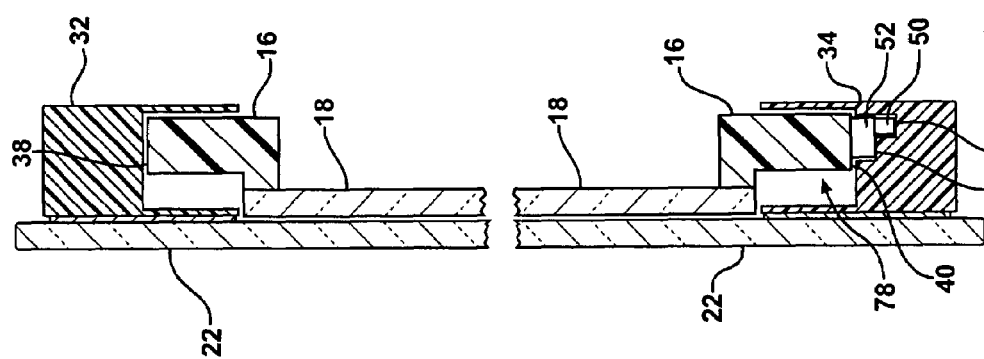
FIG. 10A is a cross-sectional side view of the sliding window assembly showing an upper track member and a lower track member with the first, second, and third channels.

Those skilled in the art realize that many combinations and configurations of channels 60, 68, 78 in track members 30, 32, 34 and tabs 50, 52, 54, 56 extending from the carrier component 16 can be implemented. One embodiment of the assembly 10, shown in FIG. 10A, has the first and second tabs 50, 52 extending from the lower edge 40 of the carrier component 16 and interfacing with the first and second channels 60, 68 of the lower track member 34. A second embodiment of the assembly 10, shown in FIG. 10B has the third and fourth tabs 54, 56 extending from the upper edge 38. The upper track member 32 defines a fourth channel 96 extending to a fourth depth for receiving the third tab 54, a fifth channel 100 extending to a fifth depth for receiving the fourth tab 56, and a sixth channel 102 extending to a sixth depth less than the fourth and fifth depths for receiving the upper edge 38 of the sliding unit 14. The first and second tabs 50, 52 are not present in the second embodiment. FIG. 10C illustrates the preferred embodiment where the first and second tabs 50, 52 extend from the lower edge 40 for interface with the first through third channels 60, 68, 78 of the lower track member 34 and the third and fourth tabs 54, 56 extend from the upper edge 38 for interface with the fourth through sixth channels 96, 100, 102 of the upper track member 32.

Those skilled in the art also realize that the sliding window assembly 10 may be equipped for either manual or automatic operation. In manual operation, the sliding unit 14 is opened and closed by hand. For automatic operation, a motor (not shown) is operatively connected to the sliding unit 14. When the motor is activated, the sliding unit 14 is driven either open or closed, depending on the desired movement. The motor may be used to drive the sliding unit 14 horizontally or vertically, depending on the configuration of the assembly 10.

Obviously, many modifications and variations of the present invention are possible in light of the above teachings. The invention may be practiced otherwise than as specifically described within the scope of the appended claims.

What is claimed is:

1. A sliding window assembly for a vehicle comprising:
    a track member;
    a sliding unit including a linear edge slidable in said track member for moving said sliding unit between a closed position and an open position;
    said sliding unit including a first tab and a second tab extending from said linear edge for interfacing with said track member;
    said track member defining a first channel extending to a first depth for receiving said first tab, a second channel extending to a second depth for receiving said second tab, and a third channel extending to a third depth less than said first and second depths for receiving said linear edge of said sliding unit; and
    said first tab slidably engaging said track member in said first channel and said second tab slidably engaging said track member in said second channel.

2. A sliding window assembly as set forth in claim 1 further comprising a longitudinal axis extending lengthwise between ends of said track member wherein said first channel includes a portion extending non-parallel to said longitudinal axis for guiding said first tab between an outside facing of said track member and an inside facing of said track member as said sliding unit moves between said closed and open positions.

3. A sliding window assembly as set forth in claim 2 wherein said portion of said first channel is curvilinear.

4. A sliding window assembly as set forth in claim 1 wherein said second depth is less than said first depth.

5. A sliding window assembly as set forth in claim 4 wherein said track member includes a first internal surface, a second internal surface, and a bottom surface defining said first channel with a first width defined between said first and second internal surfaces.

6. A sliding window assembly as set forth in claim 5 wherein said track member further includes a third internal surface and a first ledge, wherein said third internal surface, said first ledge, and said second internal surface define said second channel with a second width defined between said second and third internal surfaces.

7. A sliding window assembly as set forth in claim 6 wherein said track member further includes a fourth internal surface, a fifth internal surface, and a second ledge defining said third channel with a third width defined between said fourth and fifth internal surfaces.

8. A sliding window assembly as set forth in claim 7 wherein said first tab is sized to mate with said first width of said first channel and said second tab is sized to mate with said second width of said second channel.

9. A sliding window assembly as set forth in claim 8 wherein said first width of said first channel is less than said second width for preventing said first channel from receiving said second tab.

10. A sliding window assembly as set forth in claim 1 further comprising a fixed panel operatively connected to said track member.

11. A sliding window assembly as set forth in claim 10 further comprising an adhesive for adhering said fixed panel to said track member.

12. A sliding window assembly as set forth in claim 11 wherein said adhesive is further defined as an adhesive tape.

13. A sliding window assembly as set forth in claim 10 wherein said fixed panel includes an interior side and said track member includes an outside facing with said interior side only adhered to said outside facing.

14. A sliding window assembly as set forth in claim 10 wherein said fixed panel is further defined as a first fixed panel and a second fixed panel spaced apart from each other and defining an opening therebetween.

15. A sliding window assembly as set forth in claim 14 wherein said sliding unit includes a carrier component and a sliding panel encapsulated in said carrier component.

16. A sliding window assembly as set forth in claim 15 wherein said sliding panel includes an exterior surface and said first and second fixed panels include exterior surfaces and all of said exterior surfaces are substantially flush relative to one another when said sliding unit is in said closed position.

17. A sliding window assembly as set forth in claim 15 wherein said first and second fixed panels and said sliding panel are formed of glass.

18. A sliding window assembly as set forth in claim 1 wherein said track member includes an angled internal surface defining an end of said second channel for engaging said second tab and forcing said sliding unit into said closed position as said sliding unit moves from said open to said closed position.

19. A sliding window assembly as set forth in claim 1 wherein said track member is further defined as an upper track member and said linear edge of said sliding unit is further defined as an upper linear edge.

20. A sliding window assembly as set forth in claim 1 wherein said track member is further defined as a lower track member and said linear edge of said sliding unit is further defined as a lower linear edge.

21. A sliding window assembly as set forth in claim 20 further comprising an upper track member spaced from and substantially parallel to said lower track member and said sliding unit further comprising an upper edge slidable in said upper track member and a third tab and a fourth tab extending from said upper edge for interfacing with said upper track member.

22. A sliding window assembly as set forth in claim 21 wherein said upper track member defines a fourth channel extending to a fourth depth for receiving said third tab, a fifth channel extending to a fifth depth for receiving said fourth tab, and a sixth channel extending to a sixth depth less than said fourth and fifth depths for receiving said upper edge of said sliding unit.

23. A sliding window assembly as set forth in claim 21 further comprising a first fixed panel and a second fixed panel spaced apart from each other and defining an opening therebetween.

24. A sliding window assembly as set forth in claim 23 further comprising an adhesive for adhering said fixed panels to said upper and lower track members.

25. A sliding window assembly as set forth in claim 23 further comprising an upper panel having an exterior surface and a lower panel having an exterior surface, said upper panel adhered to said upper track member and said lower panel adhered to said lower track member.

26. A sliding window assembly as set forth in claim 25 wherein said first and second fixed panels include exterior surfaces and said exterior surfaces of said upper and lower panels are substantially flush relative to said exterior surfaces of said first and second fixed panels.

27. A track member supporting a sliding unit having an edge with a first tab and a second tab extending from the edge, said track member comprising:

a base portion;

an outer guide and an inner guide extending from said base portion;

a first channel defined within said base portion, extending to a first depth and slidably engaging the first tab of the sliding unit;

said base portion including a first internal surface, a second internal surface, and a bottom surface defining said first channel with a first width defined between said first and second internal surfaces;

a second channel defined within said base portion, extending to a second depth less than said first denth and slidably engaging the second tab of the sliding unit;

said base portion further including a third internal surface and a first ledge, wherein said third internal surface, a surface of said first ledge, and said second internal surface define said second channel with a second width defined between said second and third internal surfaces, said second width being greater than said first width;

a third channel defined within said base portion between said outer and inner guides, extending to a third depth less than said first and second depths and receiving the edge of the sliding unit, said third channel having a third width defined between said outer and inner guides and which is greater than said second width;

a longitudinal axis extending lengthwise between ends of said track member;

said first channel including a portion extending non-parallel to said longitudinal axis for guiding the first tab toward and away from said inner guide and said outer guide as the sliding unit moves between closed and open positions; and said second channel substantially parallel to said longitudinal axis for guiding the second tab as the sliding unit moves between the closed and open positions.

28. A track member as set forth in claim 27 wherein said outer guide includes a fourth internal surface, said inner guide includes a fifth internal surface, and said base portion includes a second ledge, wherein said fourth internal surface, said fifth internal surface, and said second ledge define said third channel.

29. A track member as set forth in claim 27 wherein said portion of said first channel is curvilinear.

* * * * *